United States Patent [19]
Takagi et al.

[11] Patent Number: 5,073,887
[45] Date of Patent: Dec. 17, 1991

[54] OPTICAL DISK RECORDING AND READING SYSTEM WITH DIRECTORY DATA ACCESS MECHANISM

[75] Inventors: Yuji Takagi; Isao Satoh; Makoto Ichinose; Yoshihisa Fukushima, all of Osaka; Yuzuru Kuroki, Sapporo, all of Japan

[73] Assignee: Matsushita Electric Industrial Co., Ltd., Japan

[21] Appl. No.: 372,587

[22] Filed: Jun. 28, 1989

[30] Foreign Application Priority Data

Jun. 28, 1988 [JP] Japan .................................. 63-160079

[51] Int. Cl.⁵ .............................................. G11B 7/00
[52] U.S. Cl. ...................................... 369/100; 369/30; 358/340
[58] Field of Search ................... 369/30, 32, 57, 44.28, 369/100, 111, 275.1, 275.2, 275.3, 51, 52, 47; 360/77.03, 78.11; 358/340, 328

[56] References Cited

U.S. PATENT DOCUMENTS 4,545,044  10/1985  Satoh et al. ........................ 369/32
4,910,724  3/1990   Sakagami et al. ................. 369/100

FOREIGN PATENT DOCUMENTS 0072704  2/1983  European Pat. Off. .
0223353  5/1987  European Pat. Off. .
0260115  3/1988  European Pat. Off. .
62-6321  1/1987  Japan .
63-14379  1/1988  Japan .

Primary Examiner—Roy N. Envall, Jr.
Assistant Examiner—Hung Dang
Attorney, Agent, or Firm—Lowe, Price, LeBlanc & Becker

[57] ABSTRACT

Directory data relating to user data are recorded in sectors of a checkerboard pattern or in sectors on every other track in a directory data area on an optical disk. The sectors which store the directory data are always flanked by adjacent virgin sectors in a direction normal to the tracks. Therefore, the latest directory data can be detected highly reliably without crosstalk noise from adjacent tracks. Alternatively, old directory data except the latest directory data are deleted or old directory data except the latest directory data and directory data in a predetermined number of sectors before the latest directory data are deleted, and the latest directory data can be detected highly reliably by detecting the deletion of the directory data.

5 Claims, 18 Drawing Sheets

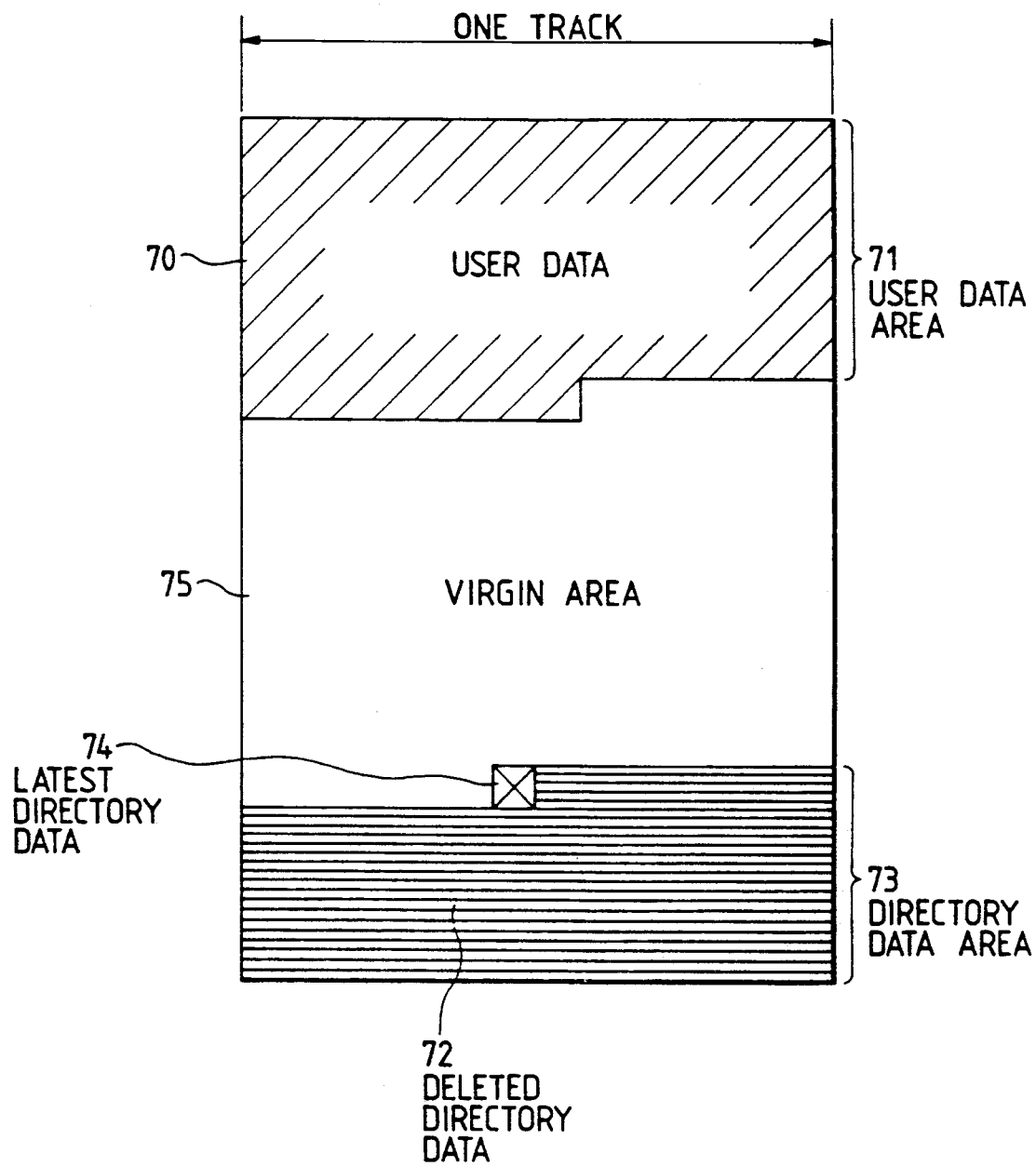

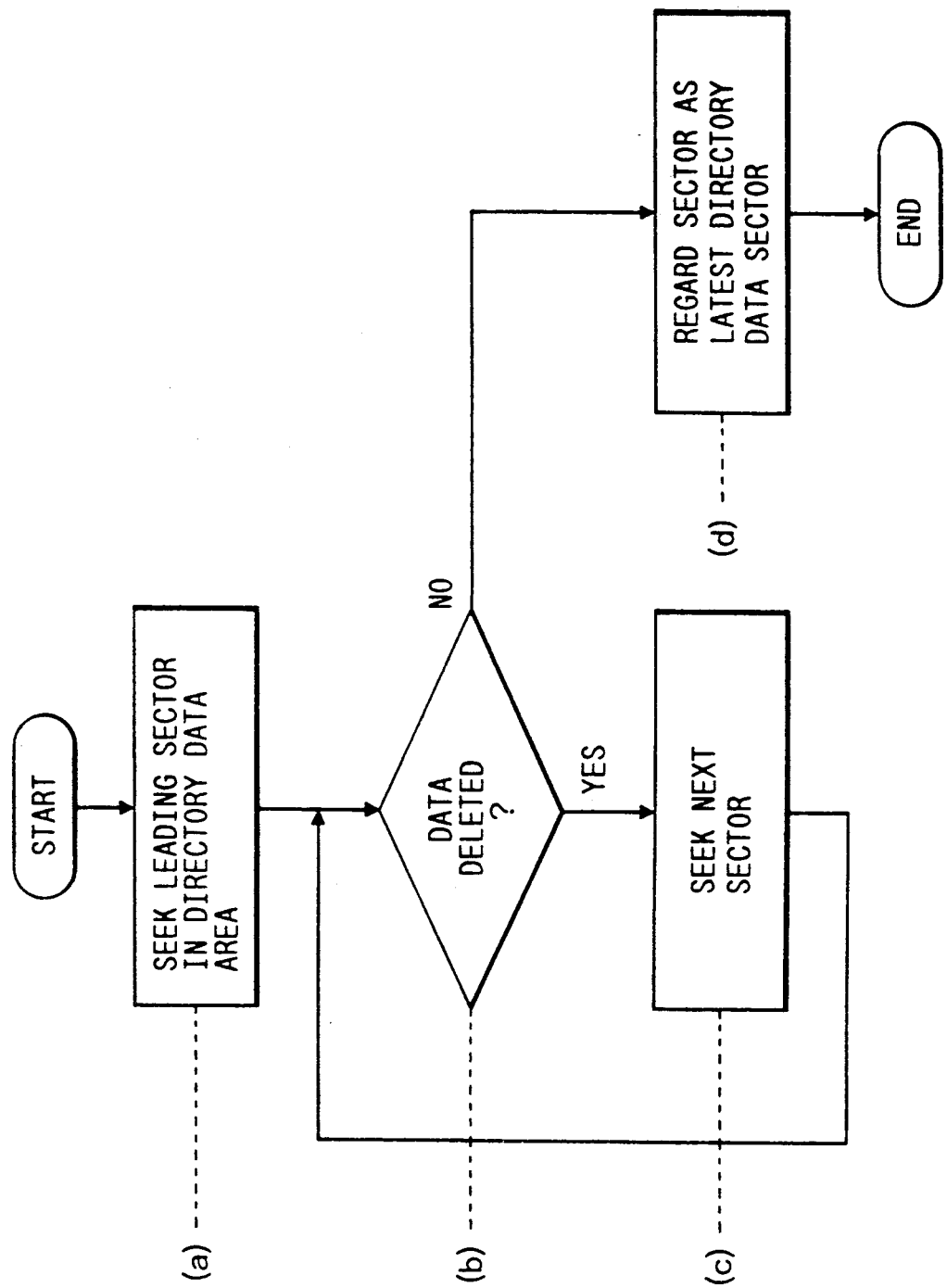

OPTICAL DISK RECORDING AND READING SYSTEM WITH DIRECTORY DATA ACCESS MECHANISM

BACKGROUND OF THE INVENTION

1. Field of the Invention:

The present invention relates to an optical disk recording and reading system for recording data on and reading data from an optical disk which has a plurality of sectors, the optical disk recording and reading system having a directory data access mechanism.

2. Prior Art:

There are known optical disk systems which employ non-rewritable optical disks known as write once read many (times) optical disks (WORM optical disks). FIG. 15 of the accompanying drawings shows a data file structure for such a WORM optical disk, the data file structure having a user data area and a directory data area. More specifically, the data file structure includes a user data area 2 which stores user data 1, a directory data area 4 which stores directory data 3 including latest directory data 5, and a virgin area 6. One track corresponds to one circular path on the optical disk.

The directory data 3 contain the file name, address information, size, and attributes of the recorded user data 1. When the optical disk is inserted into an optical disk recording and reading system, the directory data 3 are read by the system. The directory data 3 are updated each time data are subsequently recorded on and read from the optical disk. Actually, since it is impossible to rewrite recorded data on the WORM optical disk, updated latest directory data 5 are newly recorded in a leading sector of the virgin area 6. Therefore, the latest directory data 5 are always recorded in the final sector in the directory data 3 recorded in the directory data area 4, i.e., in the sector at the boundary between the directory data area 4 and the virgin area 6.

When the latest directory data 5 are to be accessed by a conventional WORM optical disk recording and reading system, the directory data area 4 is sequentially searched from its leading end until a first virgin sector is detected, and the directory data 3 recorded immediately in front of the detected virgin sector are read as the latest directory data 5.

One known method of recording on and reading directory data from a WORM optical disk based on the detection of a virgin sector, as described above, is disclosed in Japanese Laid-Open Patent Publication No. 63-14379. An application of such a method is disclosed in Japanese Laid-Open Patent Publication No. 62-6321, for example.

Generally, data can be recorded on an optical disk by burning pits each 1 μm in diameter into the disk surface with a small spot of a laser beam emitted from a semiconductor laser, and recorded data can be read from the optical disk by applying a laser beam to pits and receiving a light beam reflected from and modulated by the pits. The pits are recorded in circular tracks which are radially at spacings of about 1.6 μm, i.e., two adjacent tracks are spaced from each other at an interval or pitch of 1.6 μm. Therefore, optical disks allow storage of large quantities of information at a high density.

One problem with the high-density recording on optical disks is a crosstalk, i.e. when data are being read from one sector on a track, a signal from an adjacent track may also be picked up and mixed into the signal from the sector being read out.

This crosstalk problem will be described in detail with reference to FIGS. 16(a) and 16(b). FIG. 16(a) shows the intensity distribution of a laser beam spot on a recorded surface of an optical disk, and FIG. 16(b) is a radial cross-sectional view of the recorded surface. The recorded surface has pits 7 along tracks 10 which were burned as data by a laser beam. When a laser beam 9 from a semiconductor laser is applied to the recorded surface, a light beam 8 which is modulated by the pits 7 is reflected from the recorded surface.

As can be seen from FIGS. 16(a) and 16(b), the intensity of the laser beam applied to the recorded surface spreads into adjacent tracks, with different light intensities being indicated by the solid-line and broken-line arrows in FIG. 16(b). Even if the laser beam is well converged by an optical lens, it is impossible to focus the laser beam spot solely on the desired track, and light of a small intensity is always applied to the adjacent tracks. Accordingly, some weak noise due to cross-talk has been unavoidable.

In actual optical disk recording and reading systems, it is difficult to focus the laser beam spot well on the desired track from which data are to be read. Due to a focusing error, the intensity distribution of the applied laser beam may become wider than that shown in FIG. 16(a), or the center of the intensity distribution tends to be shifted laterally owing to a slight tracking servo error.

FIGS. 17(a) and 17(b) show the intensity distribution of an applied laser beam and the manner in which light is reflected, respectively, when the laser beam suffers from focusing and tracking errors. When there are focusing and tracking errors, a cross-talk component from an adjacent track is increased. The cross-talk-dependent light beam reflection is however much smaller than the normal light beam 8 reflected from the desired track. Any cross-talk caused by such focusing and tracking errors has been practically harmless insofar as the track containing recorded data pits is read.

When a virgin track is being read, however, crosstalk noise from an adjacent recorded track may cause a problem. More specifically, as shown in FIGS. 18(a) and 18(b), whereas uniform light is reflected from a virgin track, light which has been modulated from pits is reflected from the adjacent recorded track. Because only the modulated light reflected from the disk represents a cross-talk signal from the adjacent track, the data recorded on the adjacent track may be read as if they were recorded on the virgin track.

This erroneous cross-talk signal readout is problematic in that a virgin sector on an optical disk may not fully be confirmed as a virgin sector. The aforesaid system for detecting directory data based on the detection of a virgin sector may not be reliable in operation.

SUMMARY OF THE INVENTION

In view of the foregoing drawbacks of the conventional optical disk recording and reading systems, it is an object of the present invention to provide a optical disk recording and reading system having a directory data access mechanism which is capable of detecting directory data with high reliability.

According to the present invention, an optical disk recording and reading system includes an optical disk having a data file structure including a user data area for recording user data and a directory data area for recording directory data relating to the recorded user data, the directory data area having directory data recording sectors positioned such that they are not adjacent to each other in a direction transverse to tracks on the optical disk.

According to one preferred aspect, the directory data area has directory data recording sectors arranged in a checkerboard pattern. New directory data are recorded as latest directory data in a sector at the terminal end of the checkerboard pattern in the directory data area when user data are recorded in and read from the user data area. Since the sector storing the latest directory data is always flanked by virgin sectors on adjacent tracks, the latest directory data can be detected highly reliably without suffering from cross-talk noise from the adjacent tracks.

According to another preferred aspect, the directory data, area has directory data recording sectors on every other track therein. New directory data are recorded as latest directory data in a sector at the terminal end of the directory data area when user data are recorded in and read from the user data area. Since the sector storing the latest directory data is always flanked by virgin sectors on adjacent tracks, the latest directory data can be detected highly reliably without suffering from cross-talk noise from the adjacent tracks.

Alternatively, old directory data are deleted from the directory data area, and the latest directory data can be detected by detecting the deletion of the old directory data.

According to one preferred aspect, new directory data are recorded as latest directory data in a sector following the final sector in the directory data area from which the data have been deleted by data deleting means, and any previous latest directory data are deleted from the directory data area. Since old directory data are deleted, the latest directory data can be detected highly reliably by detecting the deletion of the directory data, without being subjected to cross-talk noise from the adjacent tracks.

According to another preferred aspect, new directory data are recorded as latest directory data in a sector which is a predetermined number of sectors after the final sector in the directory data area from which the data have been deleted by data deleting means, and directory data are deleted from a sector which is a predetermined number of sectors before the sector recording the latest directory data. Since old directory data in the sectors which are the predetermined number of sectors before the latest directory data are deleted, the latest directory data can be detected highly reliably by detecting the deletion of the directory data, without being subjected to cross-talk noise from the adjacent tracks. Even in the event that the latest directory data cannot be read out, those directory data which remain undeleted from the directory data area can be read to provide directory information that minimizes the damage resulting from the unavailability of the latest directory data. Therefore, the latest directory data can be detected highly reliably.

The above and other objects, features and advantages of the present invention will become more apparent from the following description when taken in conjunction with the accompanying drawings in which preferred embodiments of the present invention ar shown by way of illustrative example.

BRIEF DESCRIPTION OF THE DRAWINGS

FIG. 10 is a diagram of a data file structure of an optical disk recorded and read by the system shown in FIG. 7;

FIGS. 11(a)-(d) are flowcharts of a procedure for detecting latest directory data in the system shown in FIG. 7;

DETAILED DESCRIPTION OF THE PREFERRED EMBODIMENTS

Figure 1:
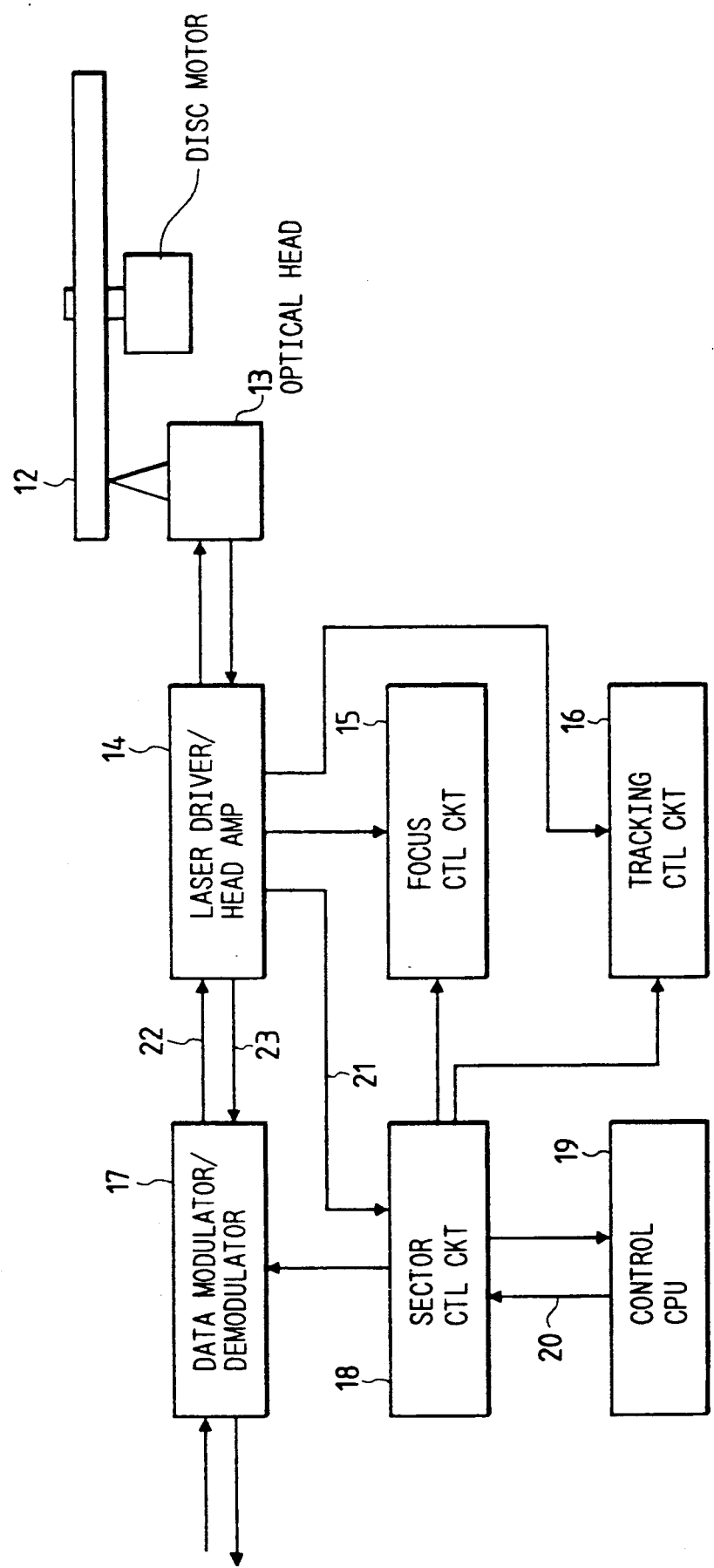
FIG. 1 is a block diagram of an optical disk recording and reading system having a directory data access mechanism according to a first embodiment of the present invention.

FIG. 1 shows an optical disk recording and reading system having a directory data access mechanism according to a first embodiment of the present invention. The optical disk recording and reading system shown in FIG. 1 includes an optical disk 12 rotatable by a disk motor, an optical head 13 having a semiconductor laser or the like for emitting a laser beam, a laser driver/head amplifier 14 for driving the semiconductor laser of the optical head 13 and amplifying a weak reflection signal detected by the optical head 13, a focus control circuit 15 for controlling the focusing of the laser beam based on a focus error signal from the laser driver/head amplifier 14, a tracking control circuit 16 for controlling the tracking of the laser beam based on a tracking error signal from the laser driver/head amplifier 14, a data modulator/demodulator 17 for digitally modulating data which have been encoded by an error correcting code and for demodulating data read from the optical disk 12, a sector control circuit 18 for searching, recording data in, and reading data from, a desired sector on the optical disk 12, and a control central processing unit (CPU) 19 for controlling the optical disk recording and reading system.

Operation of the optical disk recording and reading system of the first embodiment will be described below.

Data are recorded on the optical disk 12 as follows: The control CPU 19 first sends an address 20 of a desired sector in which the data are to be recorded, to the sector control circuit 18. In response to the supplied address 20, the sector control circuit 18 controls the tracking control circuit 16 to seek a track which contains the desired sector. The sector control circuit 18 compare a sector address 21 delivered from the laser driver/head amplifier 14 with the address 20 of the desired sector. When the compared addresses 21, 20 coincide with each other, the sector control circuit 18 operates the data modulator/demodulator 17 to start modulating the data. The laser driver/head amplifier 14 drives the semiconductor laser of the optical head 13 in response to modulated data 22 from the data modulator/demodulator 17. The optical head 13 emits a laser beam to burn pits 7 into the recording surface of the optical disk 12.

Recorded data are read from the optical disk 12 as follows: After a desired sector from which the data are to be read has been sought in the same manner as when the data are recorded, the sector control circuit 18 operates the data modulator/demodulator 17 to start demodulating the data. The data modulator/demodulator 17 demodulates read-out binary data 23 from the laser driver/head amplifier 14, and sends the demodulated data to an error correcting circuit (not shown).

The optical disk recording and reading system of the first embodiment can thus record data on and read data from the optical disk 12 by addressing the desired sector with the control CPU 19.

Figure 2:
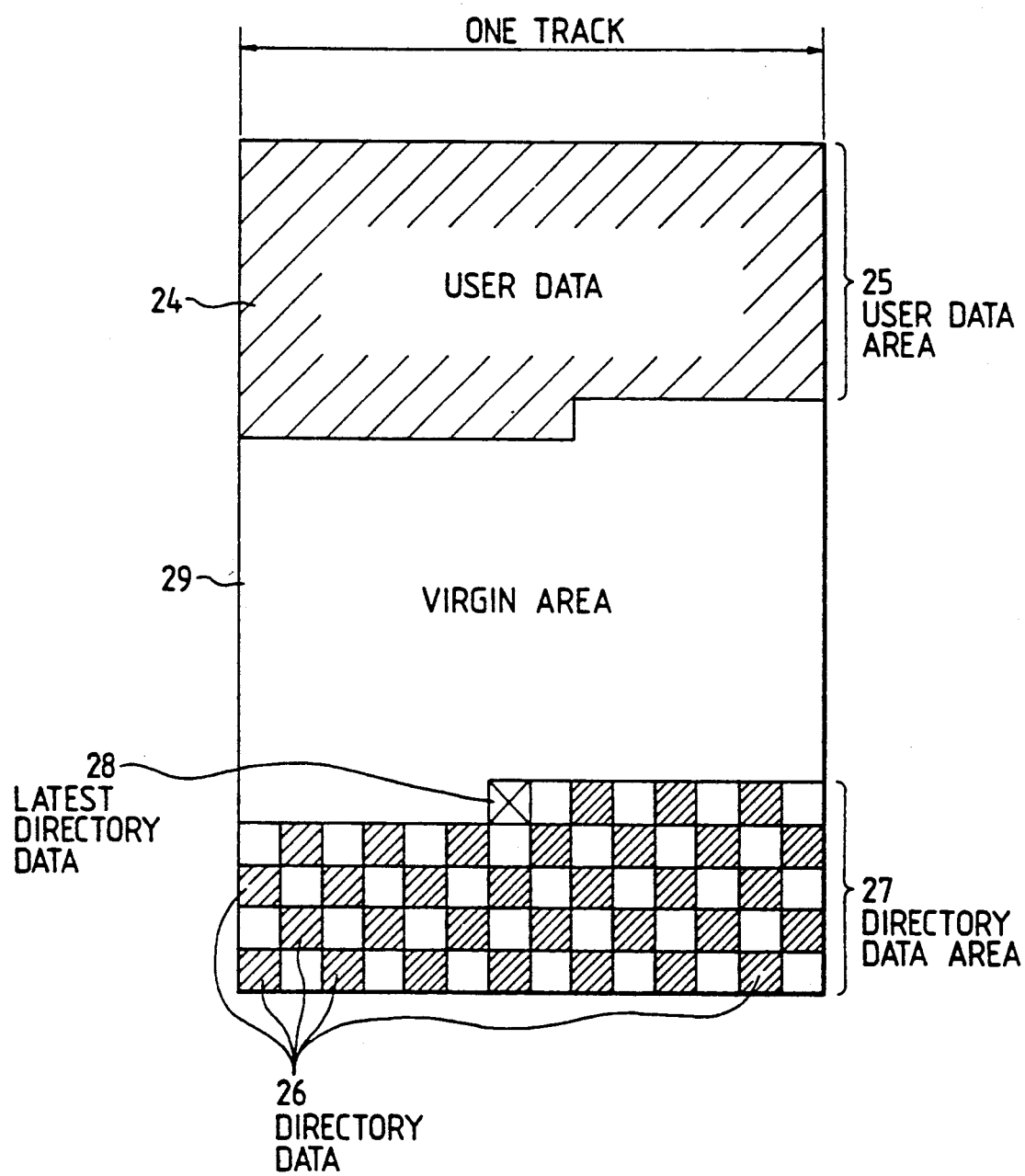
FIG. 2 is a diagram of a data file structure of an optical disk recorded and read by the system shown in FIG. 1.

FIG. 2 illustrates a data file structure of the optical disk 12 on and from which data can be recorded and read by the optical disk recording and reading system shown in FIG. 1. The data file structure includes a user data area 25 which stores user data 24, a directory data area 27 which stores directory data 26 including latest directory data 28, and a virgin area 29. One track corresponds to one circular path on the optical disk 12.

In the directory data area 27, directory data are recorded in every other sector such that the sectors in two adjacent tracks are not positioned adjacent to each other and hence the recorded sectors are not disposed adjacent to each other in both circumferential and radial directions of the optical disk 12. In the directory data area 27 as shown in FIG. 2, therefore, the recorded sectors are of a checker-board pattern. The latest directory data 28 are recorded in the sector at the terminal end of the directory data area 29, i.e., in the sector at the boundary between the directory data area 29 and the virgin area 29.

Figure 3:
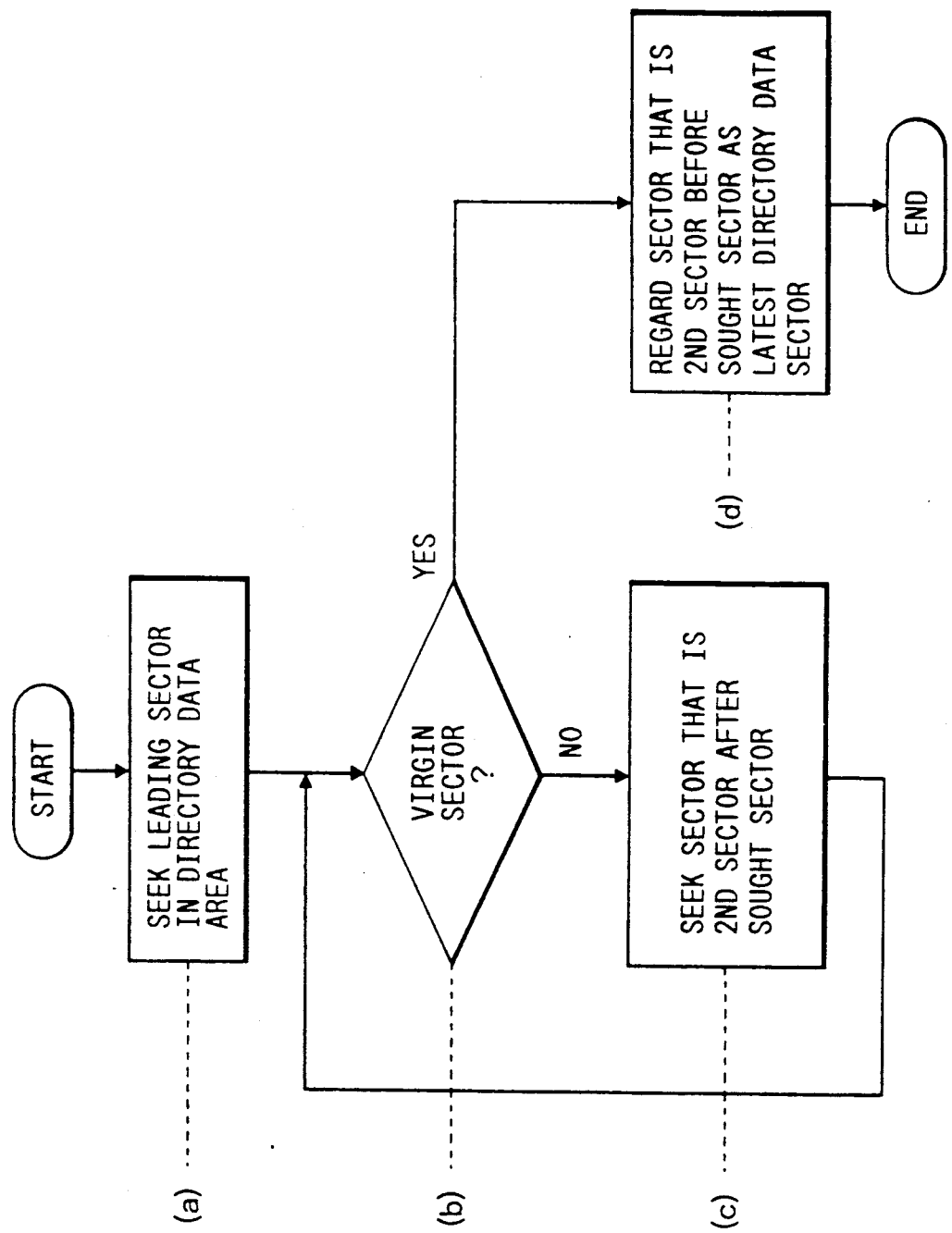
FIG. 3 consisting of (a)-(d), is a flowchart of a procedure for detecting latest directory data in the system shown in FIG. 1.

A process of detecting the latest directory data 28 from the directory data area 27 will be described below with reference to FIG. 3. In order to detect the latest directory data 28, the control CPU 19 controls the optical disk recording and reading system to detect the address of the sector which stores the latest directory data 28 according to the sequence of the following steps:

(a) The leading sector of the directory data area 27 is sought;
(b) It is checked if the sought sector is a virgin sector or not;
(c) If not a virgin sector, the sector which is the second following sector as counted from, i.e., the second sector after, the presently searched sector is sought, and then the step (b) above is repeated; and
(d) If the sought sector is a virgin sector in the step (b), then the sector which is the second preceding sector as counted from, i.e., the second sector before, the presently sought sector is the sector which stores the latest directory data 28.

Since the recorded sectors of the directory data area 27 are of a checkerboard pattern, a sector on a track in the directory data area 27, which is being checked for being a virgin sector, is flanked by virgin sectors on adjacent tracks, and hence can be checked highly reliably because no undesirable cross-talk signals come from those virgin sectors on the adjacent tracks. Virgin sectors can easily be detected by the laser driver/head amplifier 14 which effects envelope detection based on whether the read signal contains a modulated signal or not. The latest directory data 28 may be updated by detecting the latest directory data 28 according to the sequence of the steps (a) through (d) described above and thereafter recording new directory data in a sector which is the second sector after the sector which stores the present latest directory data 28.

With the optical disk recording and reading system of the first embodiment, as described above, because of the checkerboard pattern of the recorded sectors in the directory data area, a sector which is being checked on one track in the directory data area is always flanked by virgin sectors on adjacent tracks, preventing a cross-talk-dependent detection failure. Therefore, directory data can be detected highly reliably.

Figure 4:
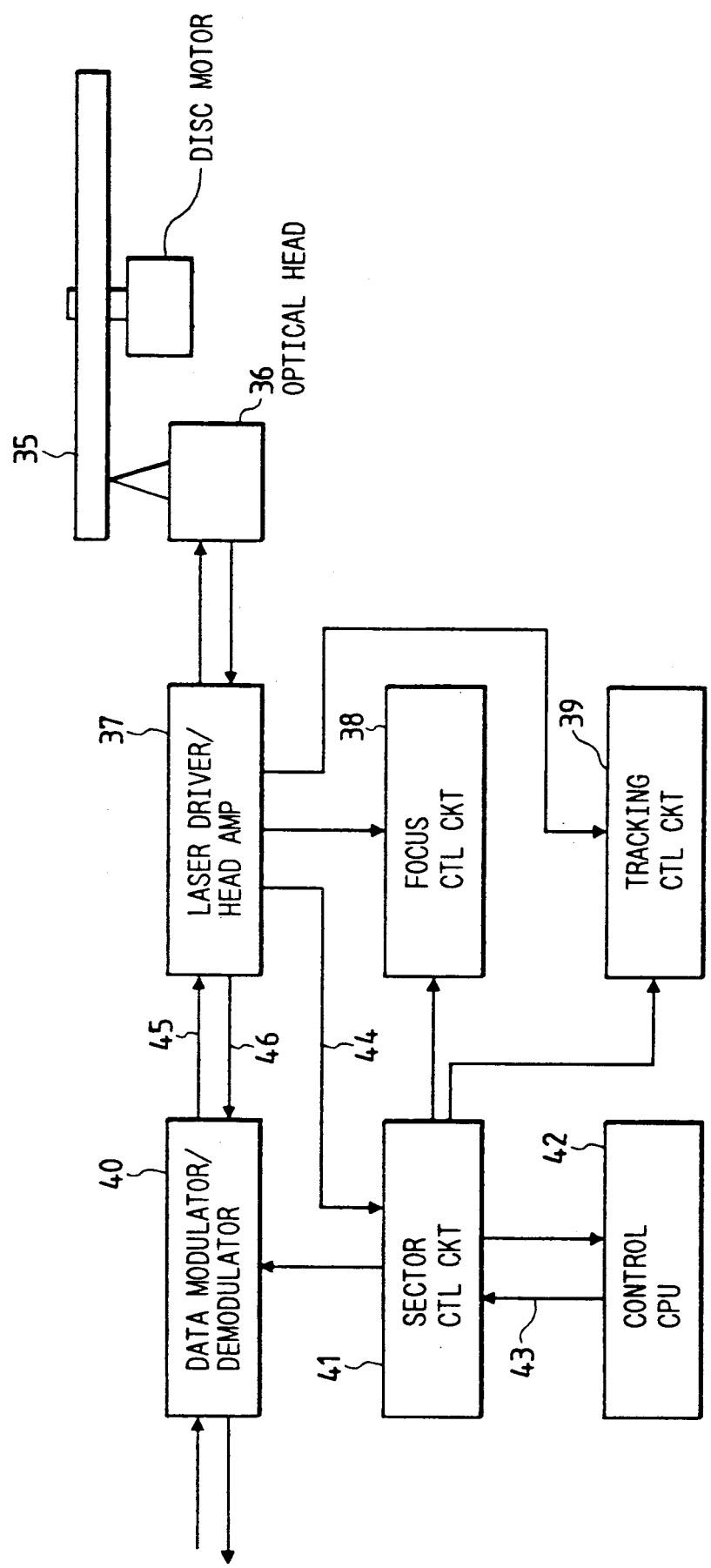
FIG. 4 is a block diagram of an optical disk recording and reading system having a directory data access mechanism according to a second embodiment of the present invention.

FIG. 4 illustrates an optical disk recording and reading system having a directory data access mechanism according to a second embodiment of the present invention. The optical disk recording and reading system shown in FIG. 4 includes an optical disk 35 rotatable by a disk motor, an optical head 36 having a semiconductor laser or the like for emitting a laser beam, a laser driver/head amplifier 37 for driving the semiconductor laser of the optical head 36 and amplifying a weak reflection signal detected by the optical head 36, a focus control circuit 38 for controlling the focusing of the laser beam based on a focus error signal from the laser driver/head amplifier 37, a tracking control circuit 39 for controlling the tracking of the laser beam based on a tracking error signal from the laser driver/head amplifier 37, a data modulator/demodulator 40 for digitally modulating data which have been encoded by an error correcting code and for demodulating data read from the optical disk 35, a sector control circuit 41 for searching, recording data in, and reading data from, a desired sector on the optical disk 35, and a control central processing unit (CPU) 42 for controlling the optical disk recording and reading system.

The optical disk recording and reading system of the second embodiment operates in the following manner:

Data are recorded on the optical disk 35 as follows: The control CPU 42 first sends an address 43 of a desired sector in which the data are to be recorded, to the sector control circuit 41. In response to the supplied address 43, the sector control circuit 42 controls the tracking control circuit 39 to seek a track which contains the desired sector. The sector control circuit 41 compares a sector address 44 delivered from the laser driver/head amplifier 37 with the address 43 of the desired sector. When the compared addresses 44, 43 coincide with each other, the sector control circuit 41 operates the data modulator/demodulator 40 to start modulating the data. The laser driver/head amplifier 37 drives the semiconductor laser of the optical head 36 in response to modulated data 45 from the data modulator/demodulator 40. The optical head 36 emits a laser beam to burn pits 7 into the recording surface of the optical disk 35.

Recorded data ar read from the optical disk 35 as follows: After a desired sector from which the data are to be read has been sought in the same manner as when the data are recorded, the sector control circuit 41 operates the data modulator/demodulator 40 to start demodulating the data. The data modulator/demodulator 40 demodulates readout binary data 46 from the laser driver/head amplifier 37, and sends the demodulated data to an error correcting circuit (not shown).

The optical disk recording and reading system of the second embodiment can thus record data on and read data from the optical disk 35 by addressing the desired sector with the control CPU 42.

Figure 5:
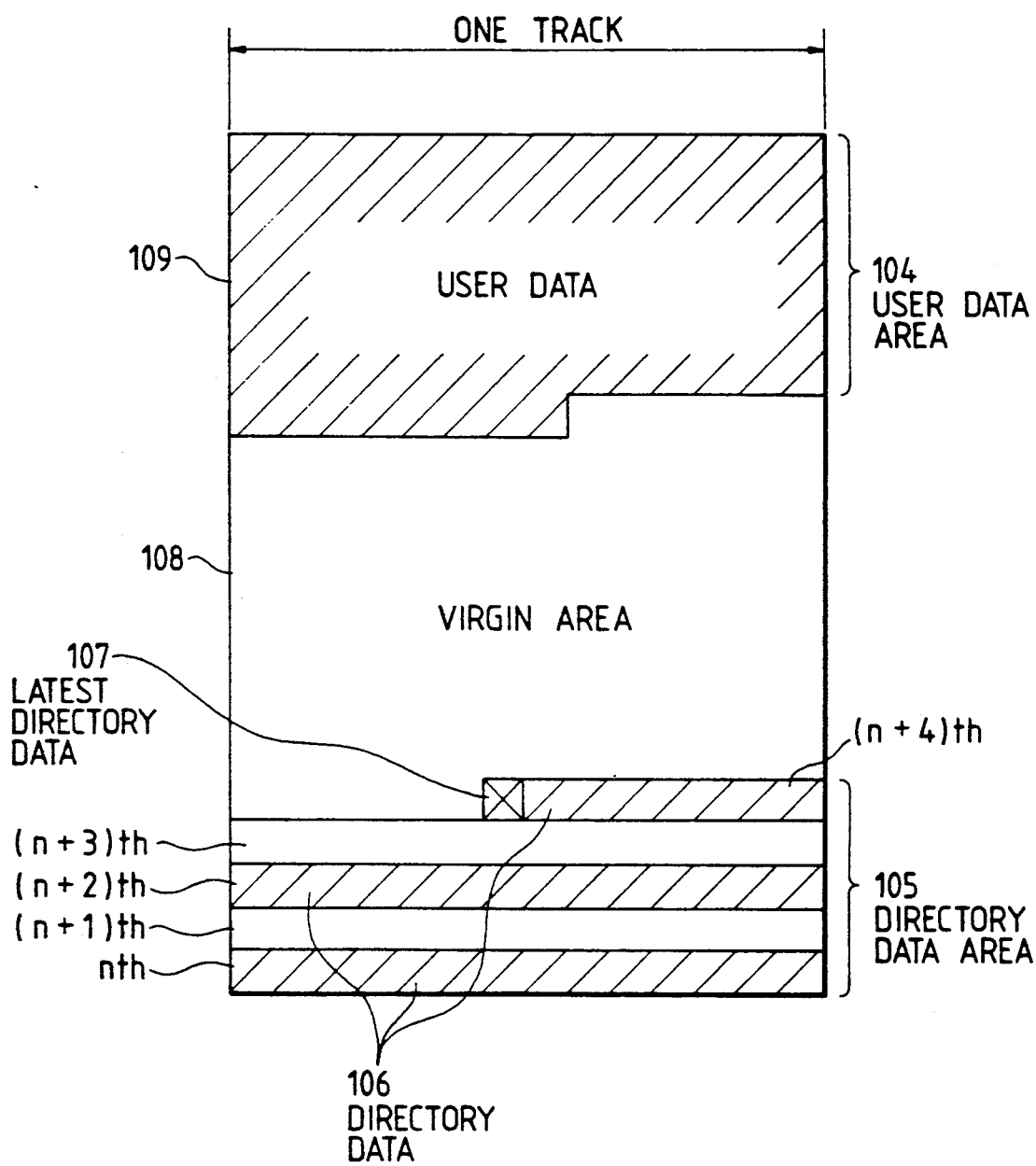
FIG. 5 is a diagram of a data file structure of an optical disk recorded and read by the system shown in FIG. 4.

FIG. 5 shows a data file structure of the optical disk 35 on and from which data can be recorded and read by the optical disk recording and reading system shown in FIG. 4. The data file structure includes a user data area 104 which stores user data 109, a directory data area 105 which stores directory data 106 including latest directory data 107, and a virgin area 108. One track corresponds to one circular path on the optical disk 35.

The directory data area 105 is composed of sectors on an nth track a (n +2)th track, and a (n +4)th track, i.e., on every other track. The latest directory data 107 are recorded in the sector at the terminal end of the directory data area 105, i.e., in the sector at the boundary between the directory data area 105 and the virgin area 108.

Figure 6:
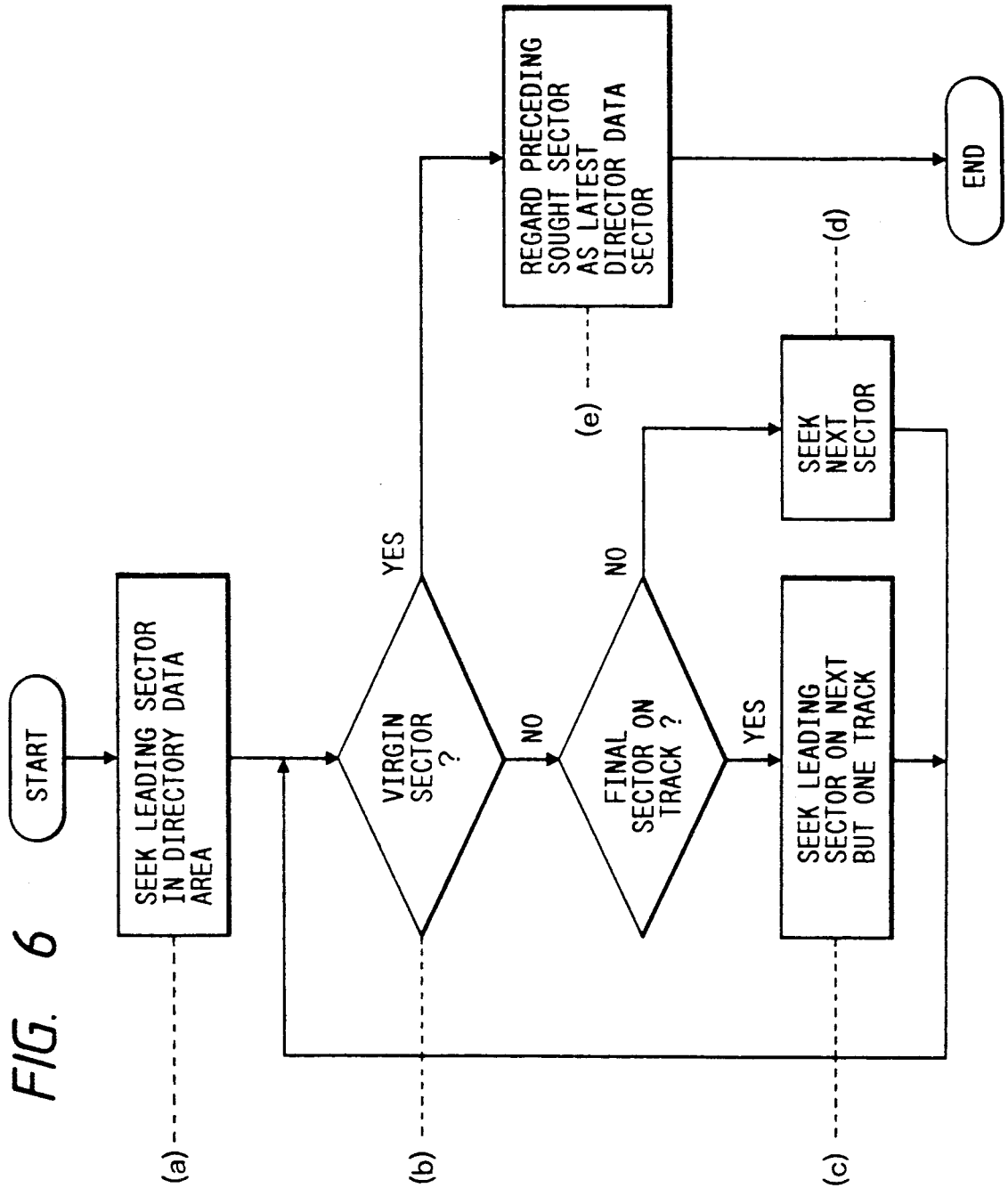
FIGS. 6(a)-(e) are flowcharts of a procedure for detecting latest directory data in the system shown in FIG. 4.

A process of detecting the latest directory data 107 from the directory data area 105 will be described below with reference to FIG. 6. In order to detect the latest directory data 107, the control CPU 42 controls the optical disk recording and reading system to detect the address of the sector which stores the latest directory data 107 according to the sequence of the following steps:

(a) The leading sector of the directory data area 105 is sought;
(b) It is checked if the sought sector is a virgin sector or not;
(c) If it is not a virgin sector and is the final sector on the track, then the first sector on the next but one track is sought, and then the step (b) above is repeated;
(d) If the sought sector is not a virgin sector in the step (b) and also not the final sector on the track then the next sector on the same track is sought, and the step (b) is repeated; and (e) If the sought sector is a virgin sector in the step (b), then the preceding sector which has been sought is the sector which stores the latest directory data 107.

Since the directory data area 107 is composed of sectors on every other track, a sector on a track in the directory data area 107, which is being checked for being a virgin sector, is flanked by virgin sectors on adjacent tracks, and hence can be checked highly reliably because no undesirable cross-talk signals are produced from those virgin sectors on the adjacent tracks. Virgin sectors can easily be detected by the laser driver/head amplifier 37 which effects envelope detection based on whether the read signal contains a modulated signal or not. The latest directory data 107 may be updated by detecting the latest directory data 107 according to the sequence of the steps (a) through (e) described above, and, if the sector storing the latest directory data 107 is the final sector, by thereafter recording new directory data in the first sector on the next but one track, or if the sector storing the latest directory data 107 is not the final sector, by thereafter recording new directory data in the next sector.

With the optical disk recording and reading system of the second embodiment, as described above, because of directory data area is composed of sectors on every other track, a sector which is being checked on one track in the directory data area is always flanked by virgin sectors on adjacent tracks, preventing a cross-talk-dependent detection failure. Therefore, directory data can be detected highly reliably.

Figure 7:
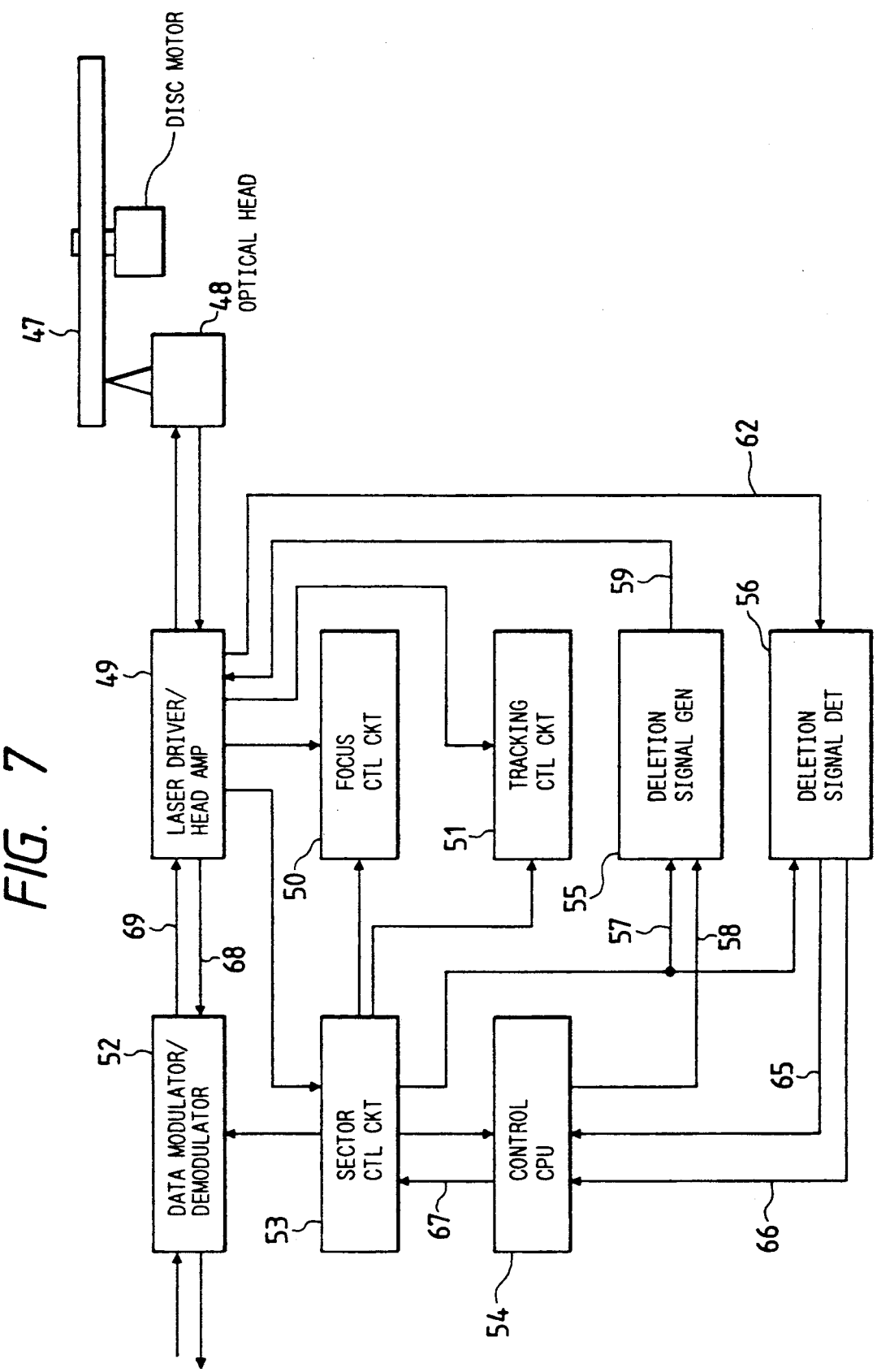
FIG. 7 is a block diagram of an optical disk recording and reading system having a directory data access mechanism according to a third embodiment of the present invention.

FIG. 7 shows an optical disk recording and reading system having a directory data access mechanism according to a third embodiment of the present invention. The optical disk recording and reading system shown in FIG. 7 includes an optical disk 47 rotatable by a disk motor, an optical head 48 having a semiconductor laser or the like for emitting a laser beam, a laser driver/head amplifier 49 for driving the semiconductor laser of the optical head 48 and amplifying a weak reflection signal detected by the optical head 48, a focus control circuit 50 for controlling the focusing of the laser beam based on a focus error signal from the laser driver/head amplifier 49, a tracking control circuit 51 for controlling the tracking of the laser beam based on a tracking error signal from the laser driver/head amplifier 49, a data modulator/demodulator 52 for digitally modulating data which have been encoded by an error correcting code and for demodulating data read from the optical disk 47, a sector control circuit 53 for searching, recording data in, and reading data from, a desired sector on the optical disk 47, a control central processing unit (CPU) 54 for controlling the optical disk recording and reading system, a deletion signal generator 55 for recording a special signal on a recorded sector to delete the data from the sector, and a deletion signal detector 56 for detecting a deletion in a sector.

The optical disk recording and reading system of the third embodiment operates in the following manner:

Data are recorded on the optical disk 47 as follows: The control CPU 54 first sends an address 67 of a desired sector in which the data are to be recorded, to the sector control circuit 53. In response to the supplied address 67, the sector control circuit 53 controls the tracking control circuit 51 to seek a track which contains the desired sector. The sector control circuit 53 compares a sector address 68 delivered from the laser driver/head amplifier 49 with the address 67 of the desired sector. When the compared addresses 68, 67 coincide with each other, the sector control circuit 53 operates the data modulator/demodulator 52 to start modulating the data. The laser driver/head amplifier 49 drives the semiconductor laser of the optical head 48 in response to modulated data 69 from the data modulator/demodulator 52. The optical head 48 emits a laser beam to burn pits 7 into the recording surface of the optical disk 47.

Recorded data are read from the optical disk 47 as follows: After a desired sector from which the data are to be read has been sought in the same manner as when the data are recorded, the sector control circuit 53 operates the data modulator/demodulator 52 to start demodulating the data. The data modulator/demodulator 52 demodulates read-out binary data from the laser driver/head amplifier 49, and sends the demodulated data to an error correcting circuit (not shown).

The optical disk recording and reading system of the third embodiment can thus record data on and read data from the optical disk 47 by addressing the desired sector with the control CPU S4.

FIG. 10 shows a data file structure of the optical disk 47 on and from which data can be recorded and read by the optical disk recording and reading system shown in FIG. 7. The data file structure includes a user data area 71 which stores user data 70, a directory data area 73 which stores deleted directory data 72 and latest directory data 74, and a virgin area 75. One track corresponds to one circular path on the optical disk 47.

In the directory data area 73, all old directory data except the latest directory data 74 are deleted by signals from the deletion signal generator 55. The latest directory data 74 are recorded in the sector at the terminal end of the directory data area 73, i.e., in the sector at the boundary between the directory data area 73 and the virgin area 75.

A process of detecting the latest directory data 74 from the directory data area 73 will be described below with reference to FIG. 11. In order to detect the latest directory data 74, the control CPU 54 controls the optical disk recording and reading system to detect the address of the sector which stores the latest directory data 74 according to the sequence of the following steps:

(a) The leading sector of the directory data area 74 is sought;
(b) It is checked if the data in the sought sector are deleted or not;
(c) If the data in the sought sector are deleted, the next sector is sought, and then the step (b) above is repeated; and
(d) If the data in the sought sector are not deleted in the step (b), then that sector is the sector which stores the latest directory data 74.

Since all old directory data in the directory data area 73 are deleted, the latest directory data can be detected without checking if the sectors in the directory data area 73 are virgin sectors or not. Therefore, the latest directory data 74 can be detected highly reliably because no undesirable cross-talk signals are applied from the adjacent tracks.

Deletion of the data from the recorded sectors and detection of the sectors from which the data are removed will be described below.

Figure 8A:
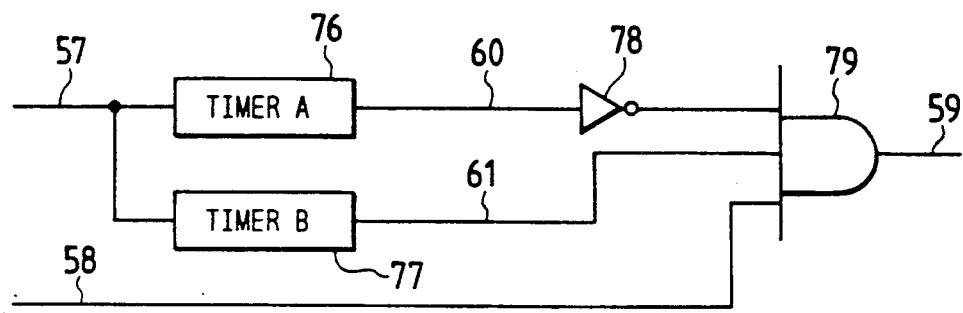
FIG. 8(a) is a block diagram of a delete signal generator in the system shown in FIG. 7.
Figure 8B:
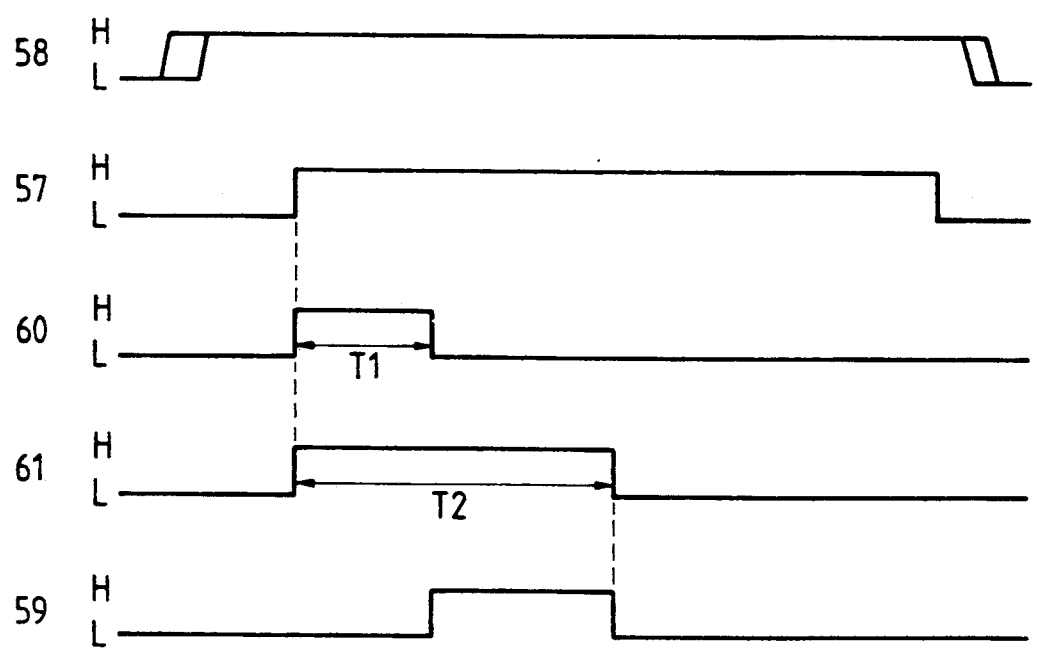
FIG. 8(b) is a timing chart of signals produced in the delete signal generator illustrated in FIG. 8(a)

FIG. 8(a) shows the deletion signal generator 55 in detail, and FIG. 8(b) a timing chart of signals produced in the deletion signal generator 55. The deletion signal generator 55 includes a timer A 76 activatable by a sector detection signal 57 for producing a high-level signal for a period T1, a timer B 77 activatable by the sector detection signal 57 for producing a high-level signal for a period T2, and gates 78, 79.

To delete the data from a certain desired sector, a delete enable signal 58 is produced from the control CPU 54. When the desired sector is detected, the sector control circuit 53 generates a sector detection signal 57 which is high for a time period corresponding to the interval of that sector. In response to the sector detection signal 57, the timer A 76 and the timer B 77 are started, and a deletion signal 59 is produced from the output signals from these timers. The deletion signal 59 is then sent to the laser driver/head amplifier 49.

The deletion signal 59 which is a DC signal can thus be recorded in a portion of the sector by the deletion signal generator thus constructed, so that the data can be deleted from the sector.

Figure 9A:
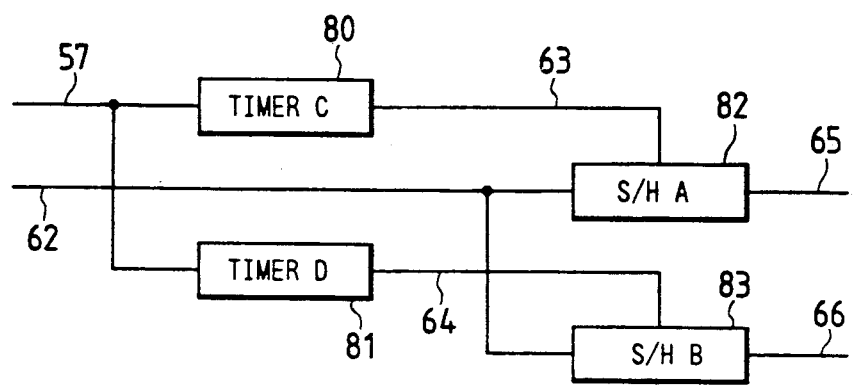
FIG. 9(a) is a block diagram of a delete signal detector in the system shown in FIG. 7.
Figure 9B:
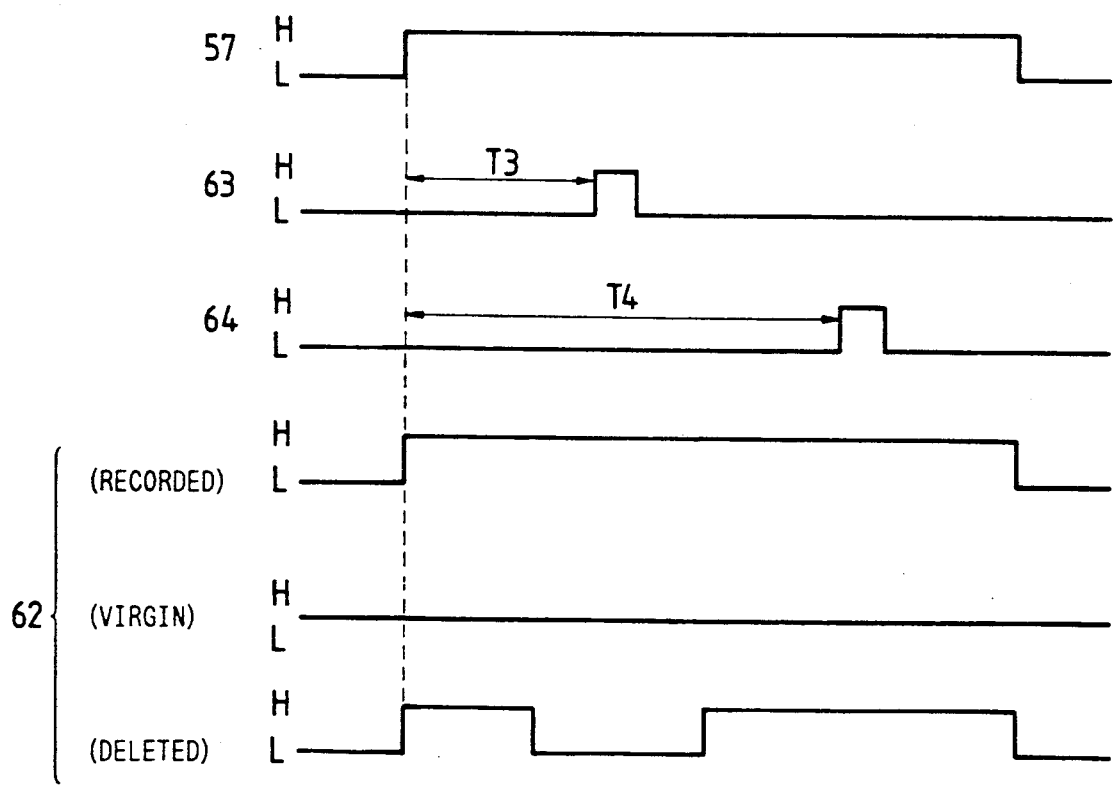
FIG. 9(b) is a timing chart of signals produced in the delete signal detector illustrated in FIG. 8(a)

FIG. 9(a) shows the deletion signal detector 56 in detail, and FIG. 9(b) a timing chart of signals produced in the deletion signal detector 56. The deletion signal detector 56 can detect the sector from which the data are deleted by the deletion signal generator shown in FIG. 8(a). The deletion signal detector 56 has a timer C 80 activatable by the sector detection signal 57 for producing a high-level sector detection signal 57 for producing a high-level signal after a period T4, a sample and hold circuit A 82 for sampling and holding a signal in response to a hold signal 63, and a sample and hold circuit B 83 for sampling and holding a signal in response to a hold signal 64.

Whether the data have been deleted from a sector or not is detected as follows: When that sector is detected, the timers A 80 and B 81 are started by the sector detection signal 57 to enable the sample and hold circuits A 82, B83 to sample and hold an envelope detection signal 62 of a read-out sector signal from the laser driver/head amplifier 49. In this manner, how the data are recorded in the sector can be detected. More specifically, the envelope detection signal 62 is of one of signal levels shown in FIG. 9(b) dependent on whether data are recorded, not recorded, or deleted in the sector. The data in the sector are determined as being deleted when output signals 65, 66 from the sample and hold circuits A 82, B 83 are low and high, respectively.

As described above, the data in a sector can be deleted by recording a DC signal on a portion of the sector, and the sector from which the data are thus deleted can be detected.

The details of the above data deletion are disclosed in Japanese Laid-Open Patent Publications Nos. 60-115074, 60-187971, etc., and any of the disclosed data deletion processes may be employed in the system of the present invention.

The latest directory data 74 may be updated by detecting the latest directory data 74 according to the sequence of the steps (a) through (d) described above, then recording new directory data in the sector next to the sector which stores the latest directory data 74, and deleting the latest directory data 74 from the sector as described above.

With the optical disk recording and reading system of the third embodiment, as described above, since all old directory data except the latest directory data 74 are deleted, the latest directory data 74 can be detected highly reliably simply by detecting the data deletion without detecting virgin sectors.

Figure 12:
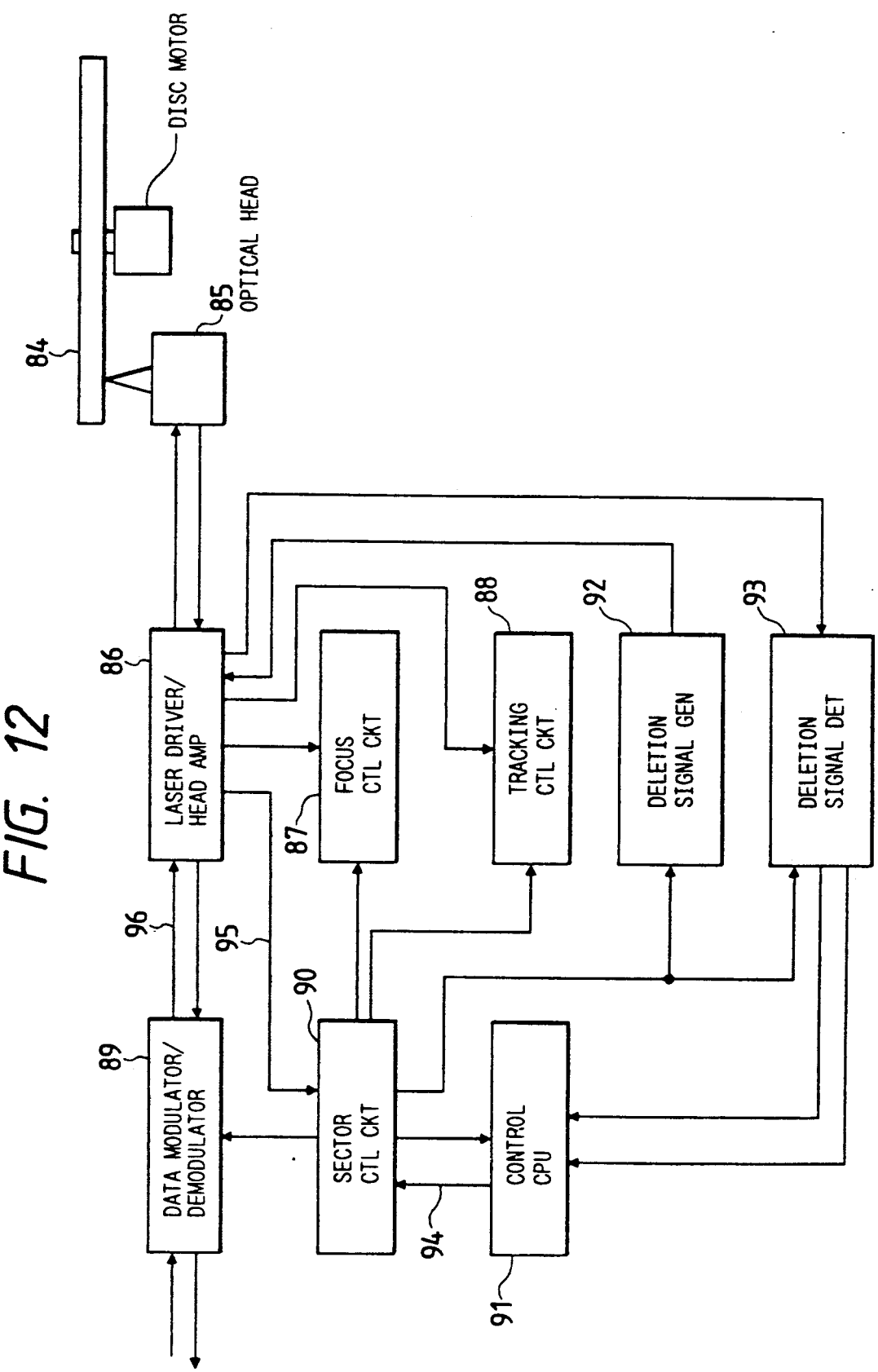
FIG. 12 is a block diagram of an optical disk recording and reading system having a directory data access mechanism according to a fourth embodiment of the present invention.

FIG. 12 shows an optical disk recording and reading system having a directory data access mechanism according to a fourth embodiment of the present invention. The optical disk recording and reading system shown in FIG. 12 includes an optical disk 84 rotatable by a disk motor, an optical head 85 having a semiconductor laser or the like for emitting a laser beam, a laser driver/head amplifier 86 for driving the semiconductor laser of the optical head 85 and amplifying a weak reflection signal detected by the optical head 85, a focus control circuit 87 for controlling the focusing of the laser beam based on a focus error signal from the laser driver/head amplifier 86, a tracking control based on a tracking error signal from the laser driver/head amplifier 86, a data modulator/demodulator 89 for digitally modulating data which have been encoded by an error correcting code and for demodulating data read from the optical disk 85, a sector control circuit 90 for searching, recording data in, and reading data from, a desired sector on the optical disk 84, a control central processing unit (CPU) 91 for controlling the optical disk recording and reading system, a deletion signal generator 92 for recording a special signal on a recorded sector to delete the data from the sector, and a deletion signal detector 93 for detecting a deletion in a sector.

Operation of the optical disk recording and reading system of the fourth embodiment will be described below.

Data are recorded on the optical disk 84 as follows: The control CPU 91 first sends an address 94 of a desired sector in which the data are to be recorded, to the sector control circuit 90. In response to the supplied address 94, the sector control circuit 90 controls the tracking control circuit 88 to seek a track which contains the desired sector. The sector control circuit 90 compares a sector address 95 delivered from the laser driver/head amplifier 86 with the address 94 of the desired sector. When the compared addresses 95, 94 coincide with each other, the sector control circuit 90 operates the data modulator/demodulator 89 to start modulating the data. The laser driver/head amplifier 86 drives the semiconductor laser of the optical head 85 in response to modulated data 96 from the data modulator/demodulator 89. The optical head 85 emits a laser beam to burn pits 7 into the recording surface of the optical disk 84.

Recorded data are read from the optical disk 84 as follows: After a desired sector from which the data are to be read has been sought in the same manner as when the data are recorded, the sector control circuit 90 operates the data modulator/demodulator 89 to start demodulating the data. The data modulator/demodulator 89 demodulates readout binary data from the laser driver/head amplifier 86, and sends the demodulated data to an error correcting circuit (not shown).

The optical disk recording and reading system of the third embodiment can thus record data on and read data from the optical disk 84 by addressing the desired sector with the control CPU 91.

Figure 13:
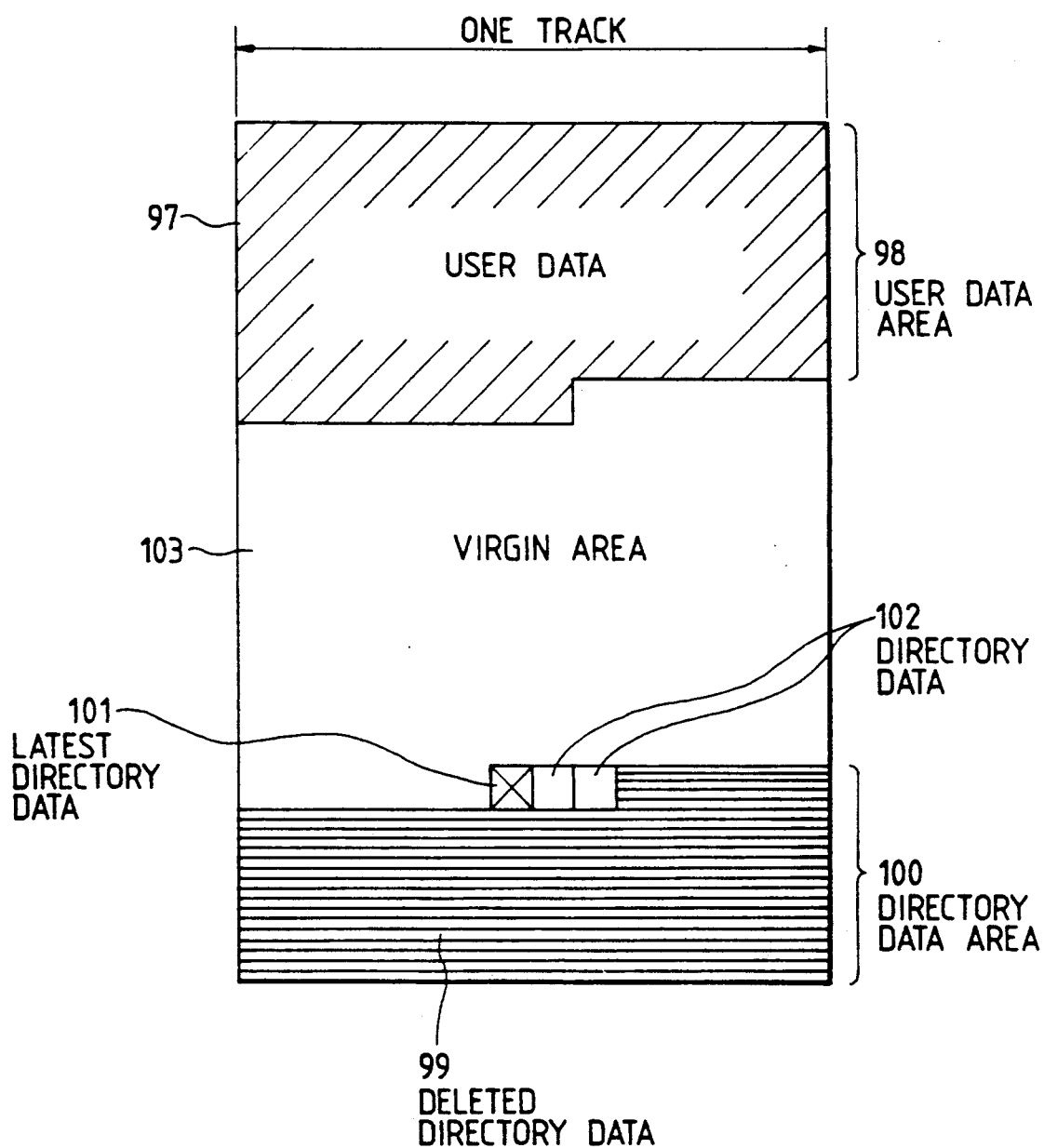
FIG. 13 is a diagram of a data file structure of an optical disk recorded and read by the system shown in FIG. 12.

FIG. 13 shows a data file structure of the optical disk 84 on and from which data can be recorded and read by the optical disk recording and reading system shown in FIG. 12. The data file structure includes a user data area 9B which stores user data 97, a directory data area 100 which stores deleted directory data 99, latest directory data 101, and directory data 102, and a virgin area 103. One track corresponds to one circular path on the optical disk 84.

In the directory data area 100, all old directory data except the latest directory data 101 and the directory data 102 in two sectors are deleted by signals from the deletion signal generator 92. The latest directory data 101 are recorded in the sector at the terminal end of the directory data area 100, i.e., in the third sector as counted from, or after, the end of the deleted directory data 99.

Figure 14:
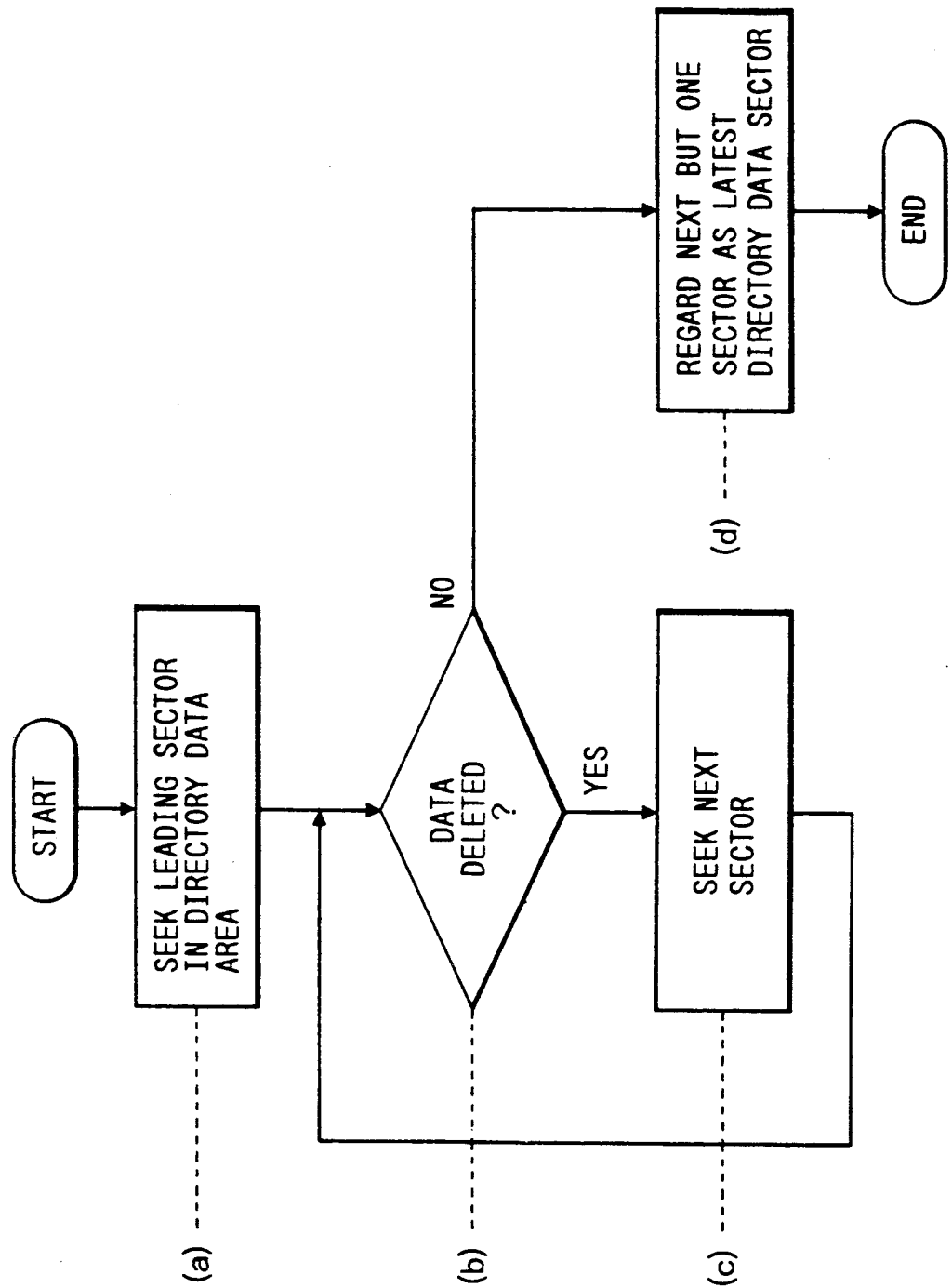
FIGS. 14(a)-(d) are flowcharts of a procedure for detecting latest directory data in the system shown in FIG. 12.
Figure 15:
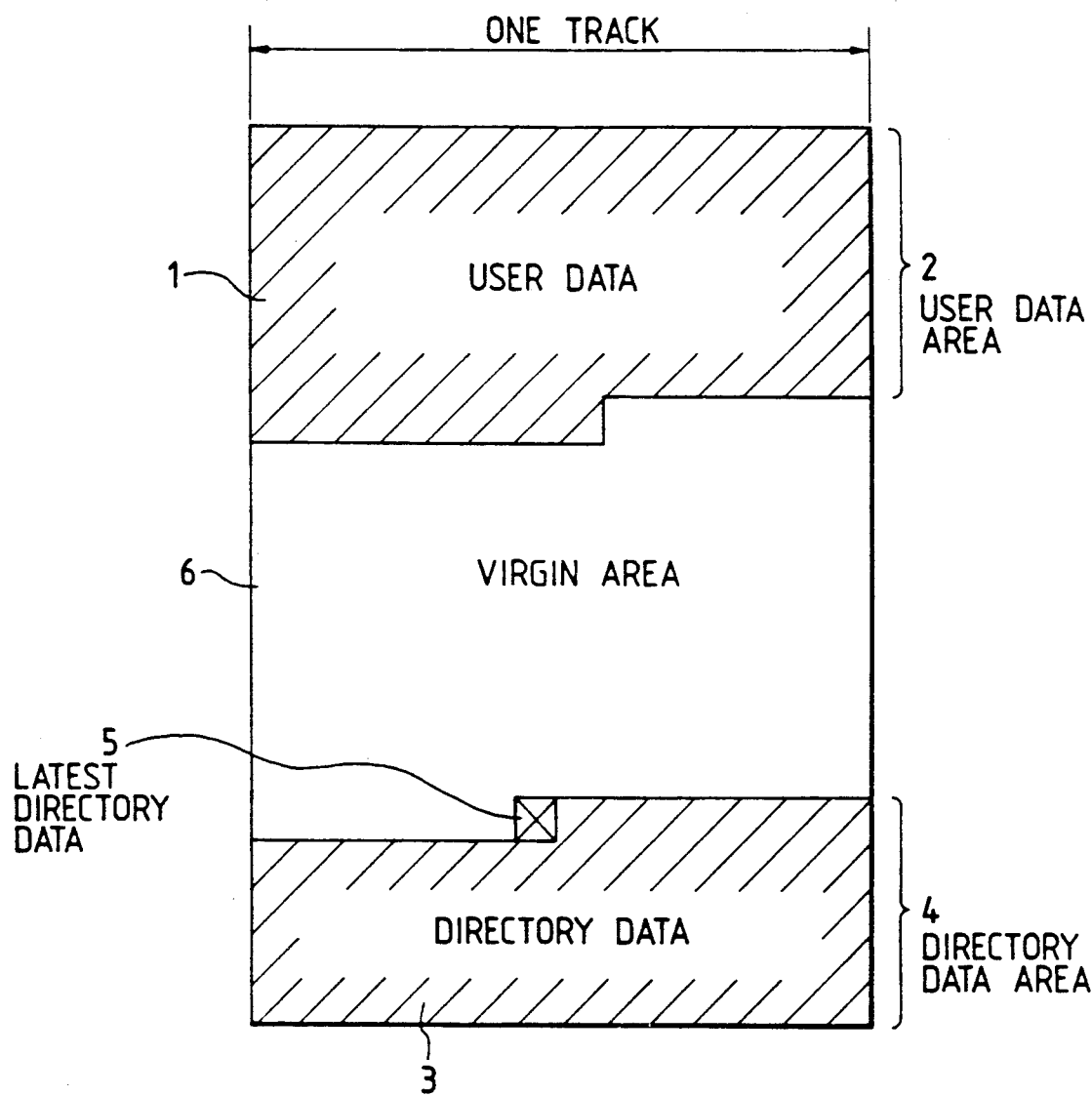
FIG. 15 is a diagram of a data file structure of an optical disk recorded and read by a conventional optical disk recording and reading system.
Figure 16A:
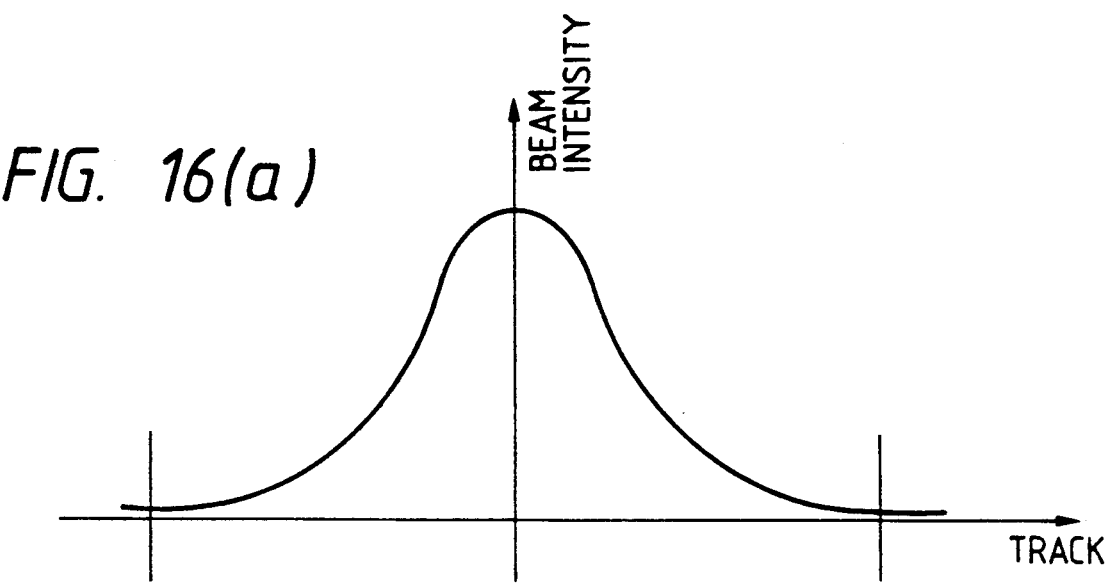
FIGS. 16(a), 16(b), 17(a), 17(b), 18(a), and 18(b) are diagrams showing laser beam intensity distributions on optical disk surfaces and cross-sectional views of the optical disk surfaces.
Figure 16B:
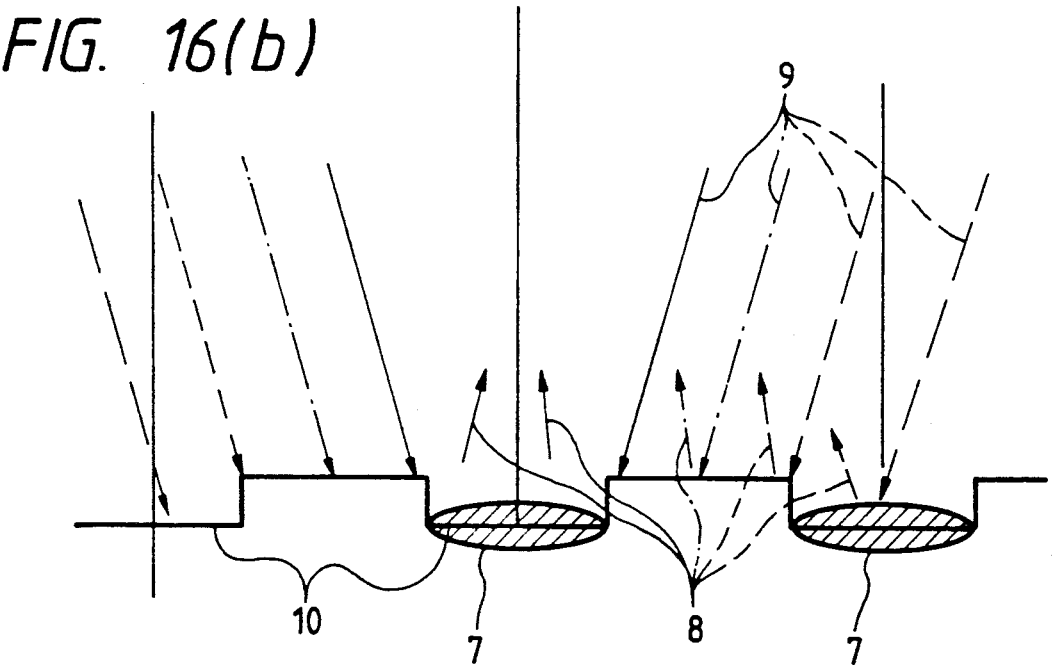
Figure 17A:
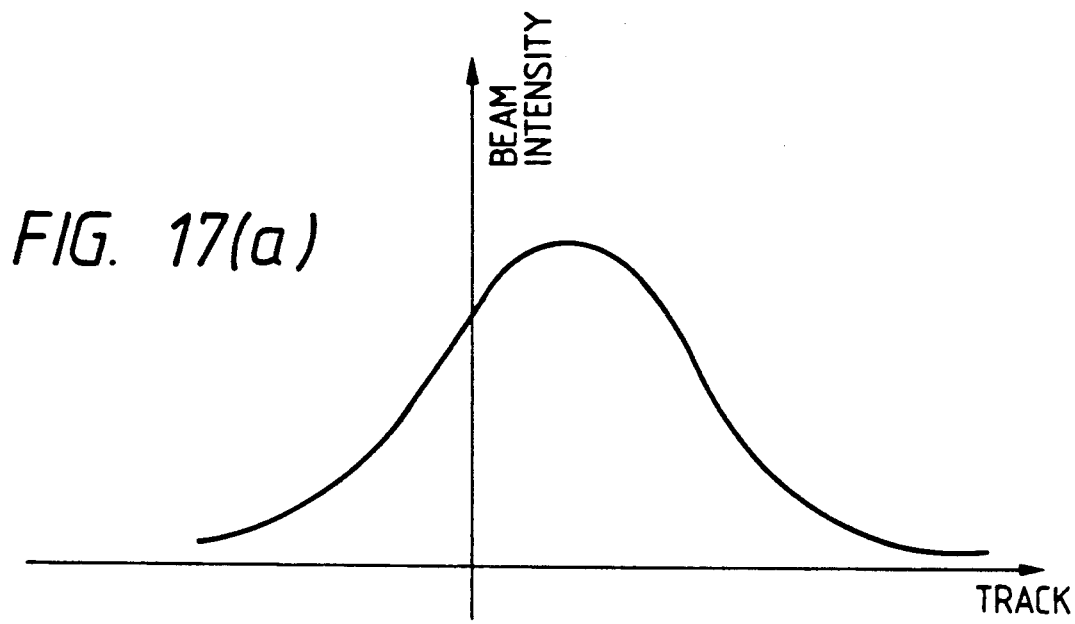
Figure 17B:
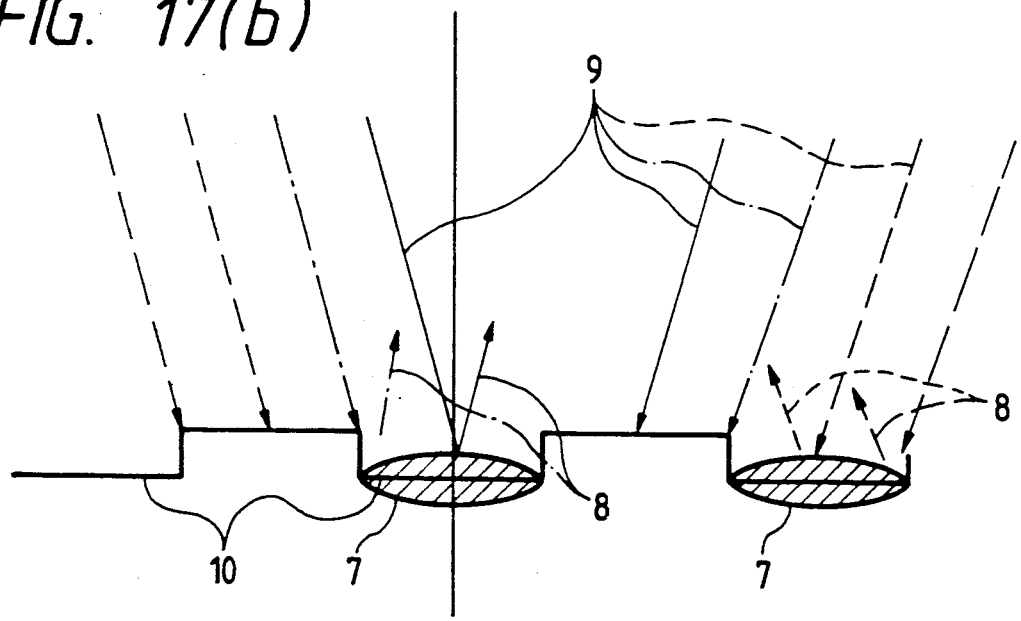
Figure 18A:
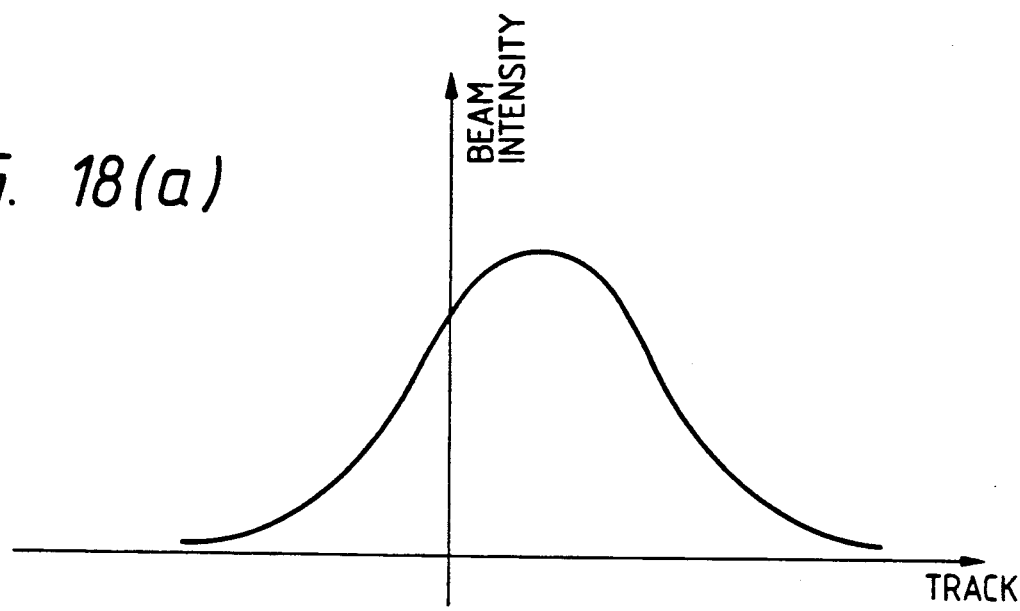
Figure 18B:
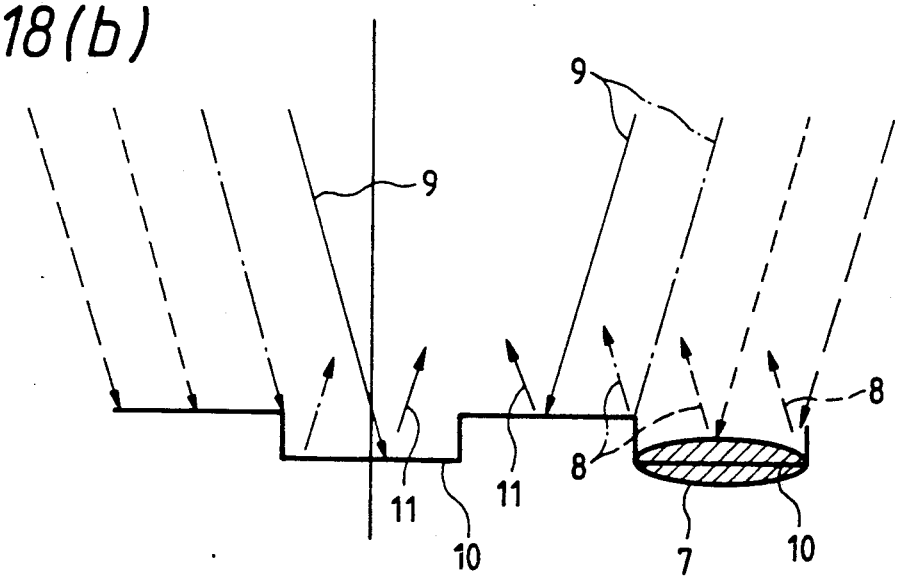

A process of detecting the latest directory data 101 from the directory data area 100 will be described below with reference to FIG. 14. In order to detect the latest directory data 101 the control CPU 91 controls the optical disk recording and reading system to detect the address of the sector which stores the latest directory data 101 according to the sequence of the following steps:

(a) The leading sector of the directory data area 100 is sought;

(b) It is checked if the data in the sought sector are deleted or not;

(c) If the data in the sought sector are deleted, the next sector is sought, and then the step (b) above is repeated; and (d) If the data in the sought sector are not deleted in the step (b), then the sector which is the second following sector as counted from the sought sector is the sector which stores the latest directory data 101.

Since all old directory data except the directory data 102 in the two sectors in the directory data area 100 are deleted, the latest directory data can be detected without checking if the sectors in the directory data area 100 are virgin sectors or not. Therefore, the latest directory data 101 can be detected highly reliably because no undesirable cross-talk signals are applied from the adjacent tracks.

Deletion of the data from the recorded sectors and detection of the sectors from which the data are deleted can, be carried out by the deletion signal generator 92 and the deletion signal detector 93 which may be constructed as shown in FIGS. 8(a), 9(a), or as disclosed in Japanese Laid-Open Patent Publications Nos. 60-115074 and 60-187971, for example.

The latest directory data 101 may be updated by detecting the latest directory data 101 according to the sequence of the steps (a) through (d) described above, then recording new directory data in the sector next to the sector which stores the latest directory data 101, and deleting the data from the sector which is the second preceding sector as counted from, i.e., the second sector before the sector storing the latest directory data 101.

With the optical disk recording and reading system of the fourth embodiment, as described above, since all old directory data except the latest directory data 101 and the directory data 102 in the two sectors are deleted, the latest directory data 101 can be detected highly reliably simply by detecting the data deletion without detecting virgin sectors. Even if the latest directory data cannot be read for some reason, the available directory data which are left undeleted in the two sectors can be read out to provide directory information which minimizes the damage resulting from the unavailability of the latest directory data. Accordingly, the directory data can be detected highly reliably.

Although certain preferred embodiments have been shown and described, it should be understood that many changes and modifications may be made therein without departing from the scope of the appended claims.

What is claimed is:

1. An optical disk recording and reading system comprising:
    an optical disk having a plurality of circular tracks which are radially adjacent to one another each having a succession of sectors for storing data therein, said optical disk having a data file structure including a user data area for recording user data and a directory data area for recording directory data relating to the recorded user data, said directory data area having directory data recording sectors positioned such that they are not adjacent to each other in a radial direction transverse to said tracks; and
    a directory data access mechanism for accessing directory data recorded in said directory data area.

2. An optical disk recording and reading system comprising:
    an optical disk having a plurality of circular tracks which are radially adjacent to one another each having a succession of sectors for storing data therein, said optical disk having a data file structure including a user data area for recording user data and a directory data area for recording directory data relating to the recorded user data, said directory data area having directory data recording sectors arranged in radial and circumferential directions in a checkerboard pattern;
    directory data access means for using as the latest directory data that directory data which is recorded in a sector at the terminal end of said checkerboard pattern in said directory data area when user data are recorded in and read from said user data area; and
    directory data updating means for updating said latest directory data by recording new directory data in a sector in said checkerboard pattern which is next, but one, to the sector recording said latest directory data.

3. An optical disk recording and reading system comprising:
    an optical disk having a plurality of circular tracks which are radially adjacent to one another each having a succession of sectors for storing data therein, said optical disk having a data file structure including a user data area for recording user data and a directory data area for recording directory data relating to the recorded user data, said directory data area having directory data recording sectors on every other track therein in a radial direction;
    directory data access means for using as the latest directory data directory that data which is recorded in a sector at the terminal end of said directory data area when user data are recorded in and read from said user data area; and
    directory data updating means for updating said latest directory data by recording new directory data in a sector on a track which in said directory data area which is next, but one, to the track that has the sector recording the latest directory data.

4. An optical disk recording and reading system comprising:
    an optical disk having a plurality of tracks each having a succession of sectors for storing data therein, said optical disk having a data file structure including a user data area for recording user data and a directory data area for recording directory data relating to the recorded user data;
    data deleting means for recording a deletion signal in a sector to delete the directory data recorded therein;
    deletion detection means for detecting deletion of directory data from a sector;
    directory data access means for using as the latest directory data that directory data which is recorded in a sector following the final sector in said directory data area from which the data have been deleted by said data deleting means when user data are recorded in and read from said user data area; and
    directory data updating means for updating said latest directory data by recording new directory data in a sector following the sector recording the latest directory data and for controlling said directory data access means to delete said latest directory data from the sector.

5. An optical disk recording and reading system comprising:
    an optical disk having a plurality of tracks each having a succession of sectors for storing data therein, said optical disk having a data file structure including a user data area for recording user data and a directory data area for recording directory data relating to the recorded user data;
    data deleting means for recording a deletion signal in a sector to delete the directory data recorded therein;
    deletion detection means for detecting deletion of directory data from a sector;
    directory data access means for using as the latest directory data that directory data which is recorded in a sector which is a predetermined number of sectors after the final sector in said directory data area from which the data have been deleted by said data deleting means when user data are recorded in and read from said user data area; and
    directory data updating means for updating said latest directory data by recording new directory data in a sector following the sector recording the latest directory data and for controlling said directory data access means to delete the directory data from a sector which is a predetermined number of sectors before the sector recording said latest directory data.

* * * * *